United States Patent
Basu et al.

(10) Patent No.: US 7,475,419 B1
(45) Date of Patent: Jan. 6, 2009

(54) SYSTEM AND METHOD FOR CONTROLLING ACCESS IN AN INTERACTIVE GRID ENVIRONMENT

(75) Inventors: Sujoy Basu, Mountain View, CA (US); Vanish Talwar, Palo Alto, CA (US); Rajendra Kumar, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 806 days.

(21) Appl. No.: 10/665,879

(22) Filed: Sep. 19, 2003

(51) Int. Cl.
    *G06F 21/00* (2006.01)
(52) U.S. Cl. .......................... 726/2; 713/168; 709/229
(58) Field of Classification Search ................ 726/1–2; 713/182; 709/229; 715/741
    See application file for complete search history.

(56) References Cited

U.S. PATENT DOCUMENTS

| | | | |
|---|---|---|---|
| 6,092,199 A * | 7/2000 | Dutcher et al. ................. 726/4 |
| 6,418,466 B1 * | 7/2002 | Bertram et al. ............. 709/221 |
| 2002/0120499 A1 * | 8/2002 | Liu et al. ...................... 705/14 |
| 2004/0128374 A1 * | 7/2004 | Hodges et al. .............. 709/223 |
| 2004/0139202 A1 * | 7/2004 | Talwar et al. ............... 709/229 |
| 2005/0027863 A1 * | 2/2005 | Talwar et al. ............... 709/226 |

OTHER PUBLICATIONS

K. Keahey, V. Welch, Fine-Grain Authorization for Resource Management in the Grid Environment, Nov. 18, 2002, 7 pages, ISSN 0302-9743, retrieved date Jan. 3, 2007.*
bio/byline: Your Desktop on the Go: Remote Desktop; Geek.com, pp. 1-11, Web site, Nov. 28, 2003, http://www.geek.com/news/geeknews/2003Aug/fea20030828021469.htm and retrieved date Jan. 03, 2007.*
Manish Bhide, Dynamic Access Control Framework Based on Events: A Demonstration 2003 IEEE, Retrieved date:Nov. 8, 2007.*
Ionut Constandache, Policy Based Dynamic Negotiation for Grid Services Authorization. LS3 Research Center and University of Hannover, Germany.Retrieved date:Nov. 8, 2007.*

* cited by examiner

*Primary Examiner*—Gilberto Barron, Jr.
*Assistant Examiner*—Samson B Lemma (57) ABSTRACT

A system and method for controlling access in an interactive grid environment is disclosed. Embodiments of the present invention include a method for controlling remote desktop access provided by an interactive grid computing system comprising determining user policies based on a classification of a user and providing a dynamic user account to the user, wherein the dynamic user account is customized based on the user policies to limit access to resources accessible through a remote desktop.

29 Claims, 8 Drawing Sheets

Determining user policies based on a classification of a user
502

Providing a dynamic user account to said user, wherein said dynamic user account is customized based on said user policies to limit access to resources associated with a graphical desktop.
504

USER PROFILE:
Classes (C,E)

---

605

Combined Policies:

Commands: ls, vi, exit, cc, gdb, make

Apps: StarOffice, RenderMan

Network Bandwidth:
Min 50%, Max 90%

Scheduling Priority:
High

SYSTEM AND METHOD FOR CONTROLLING ACCESS IN AN INTERACTIVE GRID ENVIRONMENT

TECHNICAL FIELD

Embodiments of the present invention relate to a grid computing environment, and more particularly to secure access to a remote desktop.

BACKGROUND ART

Grid computing is a method of harnessing the power of many computational resources in a network. Grid computing is a distributed computer infrastructure involving large-scale sharing applications and/or high performance processing and network bandwidth.

Figure 1:
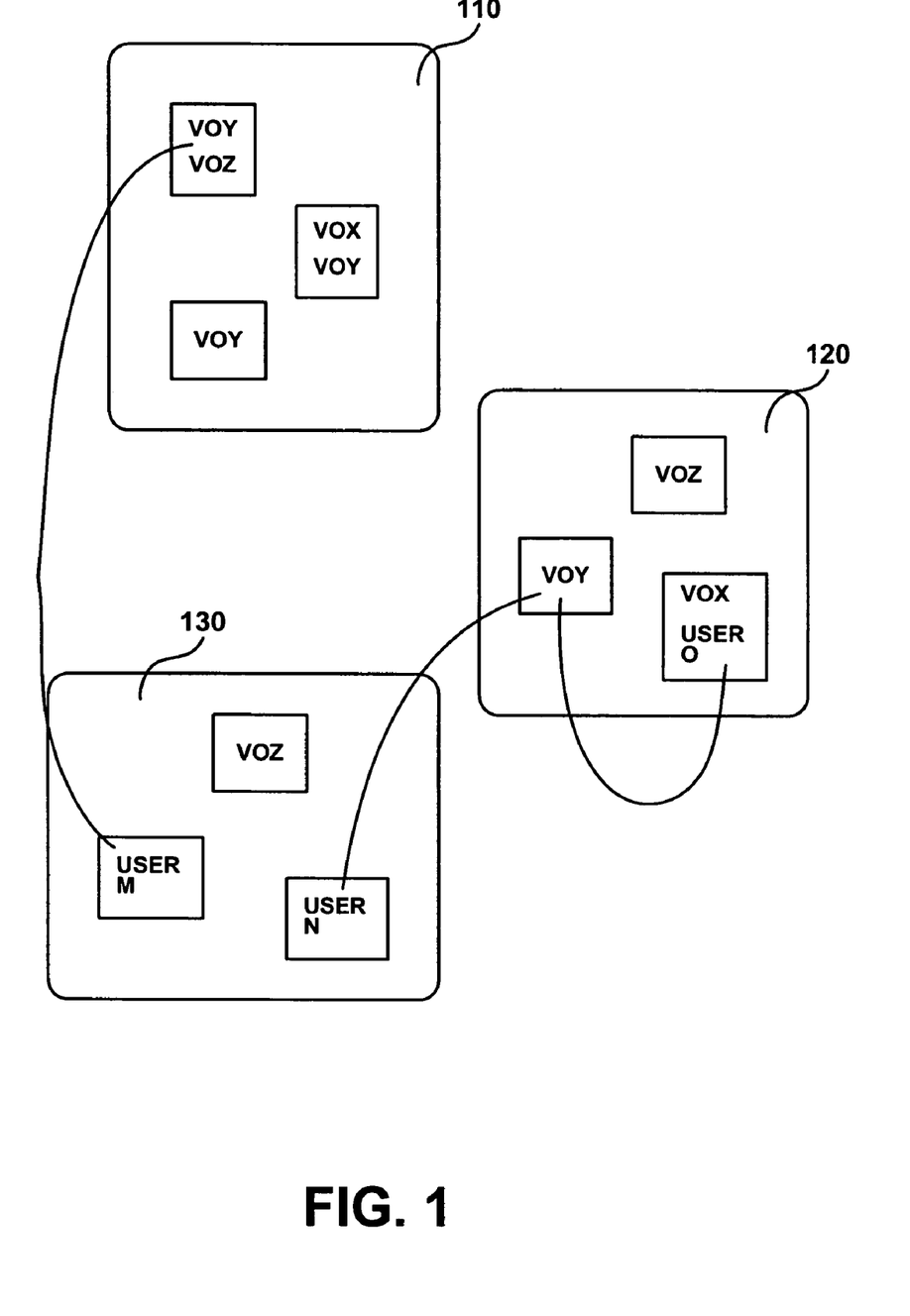
FIG. 1 is an illustration of a grid computing environment.

Referring to FIG. 1, a grid computing environment comprising a plurality of heterogeneous computing nodes distributed across multiple administrative domains. A virtual organization (e.g., VO-X, VO-Y, and VO-Z) may include nodes from different domains. For example, VO-Z includes nodes from each of Administrative Domains 110, 120, and 130.

A node (hereinafter also referred to as a computing resource) may be a member of several virtual organizations. An end-user (e.g., USER M, USER N, or USER O) may need to access remote nodes either in the same administrative domain, or across domains. For example, User O may access VO-Y from within Domain 120, or User N within Domain 130 may access the same node from outside of Domain 120. Similarly, User M of Domain 130 may access both VO-Y and VO-Z through a single node in Domain 110.

Traditionally, grid computing has provided for the execution of batch jobs in the scientific and academic community. Batch execution on a grid computing environment requires authentication, authorization, resource access, resource discovery, and other services. In support of batch processing of jobs on a grid computing environment, protocols, services, application programming interfaces, and software development kits have been developed. The conventional method and system are not particularly suited for interactive grid computing sessions.

In a grid computing environment, security can be a concern. In conventional grid computing systems, users may have access to many resources and commands that are not necessary for the resource they are using. As a result, users may use the resource in inappropriate ways.

A grid computing infrastructure that can hide the complexities of resource management from the user and that can provide secure graphical and multimedia interactive sessions would be an improvement over the conventional art.

DISCLOSURE OF THE INVENTION

A system and method for controlling access in an interactive grid environment is disclosed. Embodiments of the present invention include a method for controlling remote desktop access provided by an interactive grid computing system comprising determining user policies based on a classification of a user and providing a dynamic user account to the user, wherein the dynamic user account is customized based on the user policies to limit access to resources accessible through a remote desktop.

A system for controlling access to a remote desktop in an interactive grid computing environment is also disclosed.

BRIEF DESCRIPTION OF THE DRAWINGS

The above and other objects and advantages of the present invention will be more readily appreciated from the following detailed description when read in conjunction with the accompanying drawings, wherein.

BEST MODES FOR CARRYING OUT THE INVENTION

Reference will now be made in detail to embodiments of the present invention, a system and method for controlling access in an interactive grid environment, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention can be implemented on software running on a computer system. The computer system can be a personal computer, notebook computer, server computer, mainframe, networked computer, handheld computer, personal digital assistant, workstation, and the like. This software program is operable for providing secure access to a remote desktop across firewalls in an interactive grid environment. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," or "determining," or "classifying," or "providing," or "assigning," or "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Accordingly, embodiments of the present invention provide a system and method for controlling access in an interactive grid environment. As a result, other embodiments of the present invention serve the above purpose and are able to provide controlled access to a remote desktop by assigning a dynamic user account to a user for a resource on the interactive grid computing system. Because of controlled desktop access, the present invention is significantly less susceptible to attack than previous techniques in the prior art for providing access to remote resources based solely on uncontrolled access. More specifically, determining a user classification and assigning a dynamic user account, the present invention is capable of controlling access to a remote desktop. Moreover, other embodiments of the present invention serve the above purposes and provide for controlled interactive grid sessions, resulting in an improved grid computing environment that can be interactive and can provide controlled remote access.

Grid Computing Environment for Conducting Interactive Computing Sessions

Figure 2:
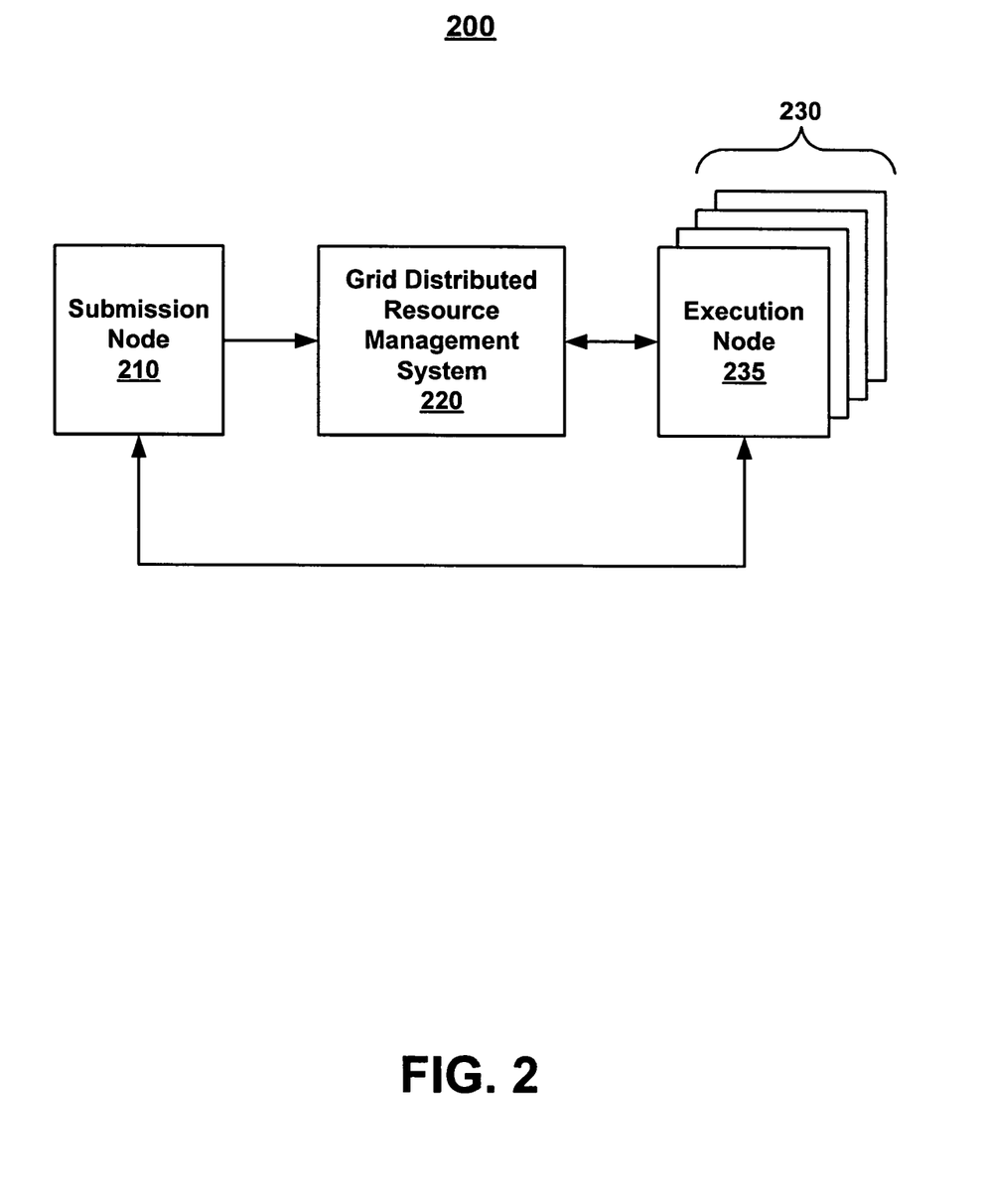
FIG. 2 is a data flow diagram illustrating the flow of information when implementing a grid computing environment, in accordance with one embodiment of the present invention.

Referring now to FIG. 2, a data flow diagram is shown illustrating the implementation of an exemplary grid computing system 200, in accordance with one embodiment of the present invention. The grid computing system consists of a plurality of heterogeneous execution nodes 230 distributed across multiple administrative domains. That is, the plurality of heterogeneous execution nodes reside in remote locations that are coupled together through a communication network, such as, the Internet. The plurality of heterogeneous execution nodes can be configured in any type of formation, for example, a plurality of clusters or nodes. The plurality of execution nodes 230 is managed by a grid distributed resource management (DRM) system 220.

The grid computing system 200 is capable of supporting graphical interactive sessions. A general discussion describing graphical interactive sessions is provided in the following co-pending U.S. patent application assigned to the present assignee: Ser. No. 10/340,436, entitled "GRID COMPUTING CONTROL SYSTEM," by Talwar et al., filed on Jan. 10, 2003, the disclosure of which is hereby incorporated herein by reference.

In the data flow diagram of FIG. 2, an end-user submits a request for an interactive session to the grid DRM through a submission node 210. On receiving the request from the user the grid DRM selects a remote execution node 235 based on the session requirements, and reserves this node 235 for the requested duration of the session. In addition, the grid DRM also performs an advance reservation of fine grained resources like central processing unit (CPU) and network bandwidth for the user's session. At the requested time, the grid DRM would establish an interactive session between this remote execution node 235 and the end-user's submission node 210. The end-user then interacts directly with this remote execution node 235 through the established session.

Figure 3:
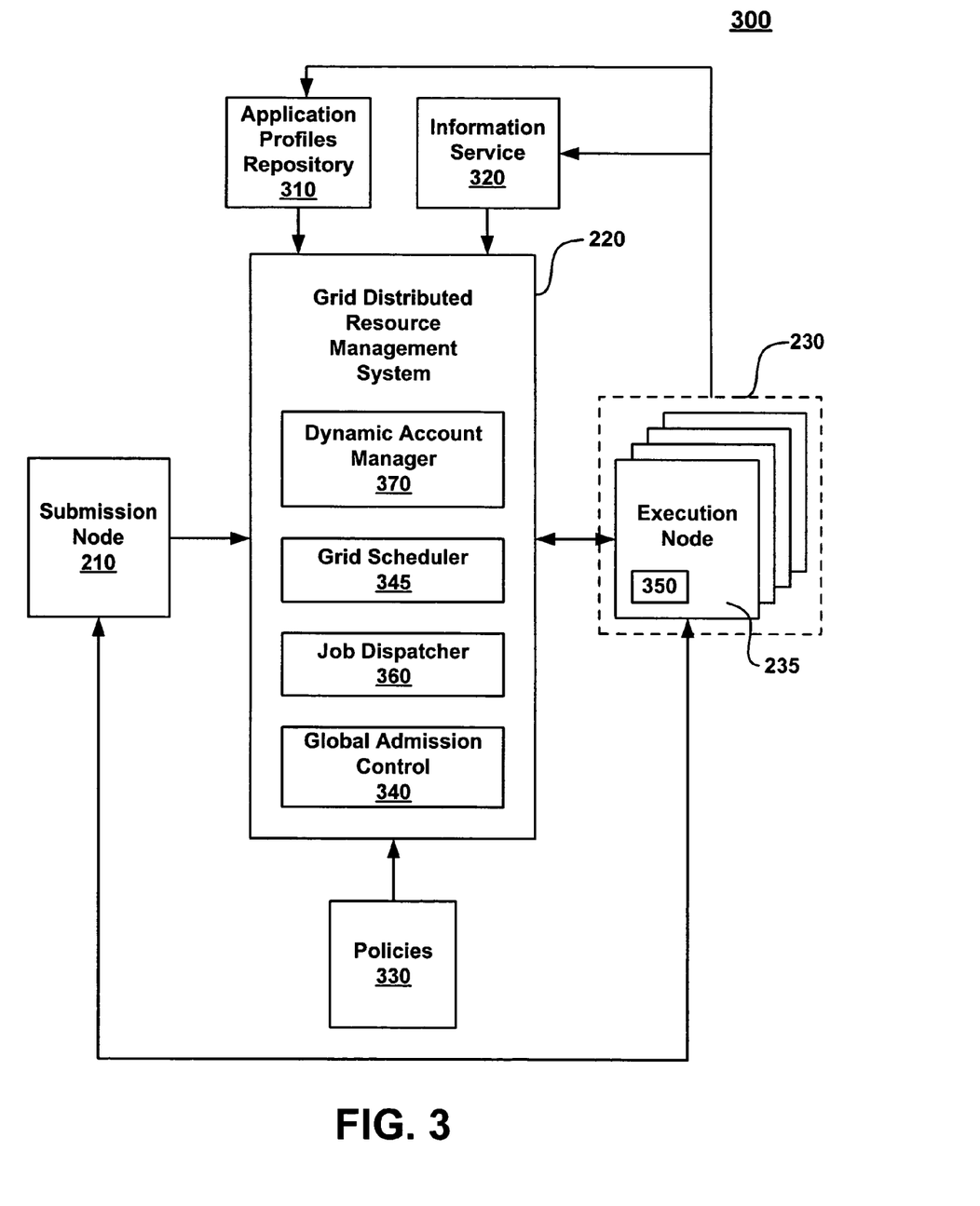
FIG. 3 is a block diagram illustrating an exemplary grid computing environment, in accordance with one embodiment of the present invention.

Referring now to FIG. 3, a block diagram of an exemplary grid computing environment 300 is shown in more detail, in accordance with one embodiment of the present invention. The grid computing environment 300 comprises a submission node 210, a grid scheduler node 220, and a plurality of execution nodes 230, as previously described in relation to FIG. 2. In addition, each of the blocks in FIG. 3 within the grid computing environment 300 are remotely located, in one embodiment. Also, the configuration of the blocks allows for the inclusion of one or more blocks located in one node location. The blocks in FIG. 3 are communicatively coupled together through a network, such as, the Internet.

In addition, the grid computing environment 300 also comprises an information service 320. The information service 320 stores information about the computing resources associated with and located at each of plurality of execution nodes 230. In addition, an application profiles repository 310 stores the application profiles of the grid computing environment 300. The policies module 330 provides the rules and policies for implementing and running the grid computing environment 300.

In one embodiment of the present invention, the end-user can submit requests directly to the remote execution node 235, to launch multiple applications. A session launching multiple applications is defined as a global interactive session. This global interactive session thus constitutes the interaction of the end-user with the remote node, and involves the launching of one or more applications. Subsequently, the end-user in the session uses and interacts with the launched applications through separate per-application sessions. These interactions could be textual or graphical based. As such, the grid computing system 200 supports graphical interactive sessions between end-users and remote execution nodes. An example of a global interactive session is a remote display session wherein the graphical desktop of the remote execution node 235 is exported to the submission node 210.

In another embodiment of the present invention, the end-user submits requests to launch a single application. A session launching one application is defined as a per application interactive session. A per-application interaction session constitutes the association between the end-user and the executing application, where the end-user interacts directly with the application. A per-application interactive session occurs in the context of a global interactive session.

In one embodiment, a hierarchical admission control is achieved through the implementation of global and per-application interactive sessions. Admission control is implemented through a global admission control module 340 at the grid DRM node 220, and a per-application session admission control module 350 at the selected remote execution node 235. The global admission control module 340 and the per-application admission control module 350 make admission control decisions for global and per-application sessions, respectively.

The following is the sequence of steps for initiating global and per-application sessions, in accordance with one embodiment of the present invention. To start, the end-user creates a job request template for a new global interactive session, specifying the resource requirements, session requirements, and the desired list of applications to be launched during the session. This request is submitted to the grid DRM node 220 from the submission node 210.

The request is received by a grid scheduler 345 running on the grid DRM node 220. In the first pass, the grid scheduler 345 performs a matching of resources in the plurality of remote execution nodes 230 to satisfy the coarse requirements of the user, for example, matching of the hardware requirements of the user. The grid DRM 220 provides a distributed repository where various resources can publish their services, in one embodiment. The grid scheduler 345 queries this distributed repository, as well as the application profiles repository 310 and the information service 320, to discover resources that match with the user's job needs.

In the next pass, the grid scheduler 345 selects the best remote execution node that can admit the requested global interactive session satisfying the quality-of-service (QoS) requirements for the desired list of applications to be launched during the global session. During this step, the grid scheduler 345 interfaces with the global admission control system 340, which performs the admission for the requested global interactive session.

At this time, a reservation is made on the selected remote execution node 235 for the requested global interactive session. The reservation is also made for fine grained resources such as CPU, network bandwidth, etc.

At the requested time, the selected remote execution node 235 is allocated to the end-user, and a job dispatcher 360 at the grid DRM 220 dispatches the request for the new global interactive session to the remote execution node 235. In addition, service level agreements (SLA) for the session are passed to the remote execution node 235.

A configuration process configures the system before launching the global interactive session. This involves the creation of a dynamic account by a dynamic account manager 370 at the grid DRM 220. A global interactive session is then initiated between the allocated execution node and the end-users' submission node. The dynamic account manager 370 maintains pools of dynamic accounts on each resource. Unlike normal user accounts which remain permanently assigned to the same real-world user, a dynamic account is assigned to a user temporarily. After the user has been authenticated, the user may be authorized to use a normal static account if authorized, or the user may be assigned a dynamic account from a pool of dynamic accounts.

Alternately the user's membership in a virtual organization (VO) may be verified by a directory service maintained by the VO. In that case, a dynamic account from the pool maintained for that VO can be assigned to the user. This approach is more scalable since every user joining or leaving a VO does not require the addition or deletion of a file entry on all the resources made available to the VO.

The end-user can now request new per-application interactive sessions directly through the started global interactive session. The requests for per-application interactive sessions are verified for access control checks, and if successful are passed onto the session admission control system 350 on the associated remote execution node (e.g., execution node 235). The session admission control system 350 performs an admission control check to determine if the requested per application session can be admitted into the global interactive session. If not, the request for new per-application session is denied. Otherwise, the per-application session is started.

In addition, for QoS purposes, resource management monitoring agents monitor the global interactive session and per-application session utilization values. The monitored data is aggregated by aggregator agents. Enforcement agents use this data to enforce the SLA and QoS requirements. For example, the enforcement agents can end the global interactive session at the time specified in the SLA. After the global interactive session is ended, the execution node is now freed up to execute a new global interactive session if scheduled by the grid scheduler 345.

A System and Method for Controlling Access in an Interactive Grid Environment

Application service providers (ASPs) provide customers the ability to use applications without owning the software or the infrastructure needed to run the application. Embodiments of the present invention provide traditional business customers, digital content creators, scientists doing visualization of large data sets, software developers, and design engineers using electronic or mechanical computer aided design (CAD) tools a system for interactively using applications in a grid environment that is protected by a firewall. Embodiments of the present invention provide controlled access to a graphical representation of a full desktop of a computer accessed on an interactive grid computing system. Providing controlled access to the desktop of a remote computer provides controlled interactive use of a resource on the remote computer.

Figure 4:
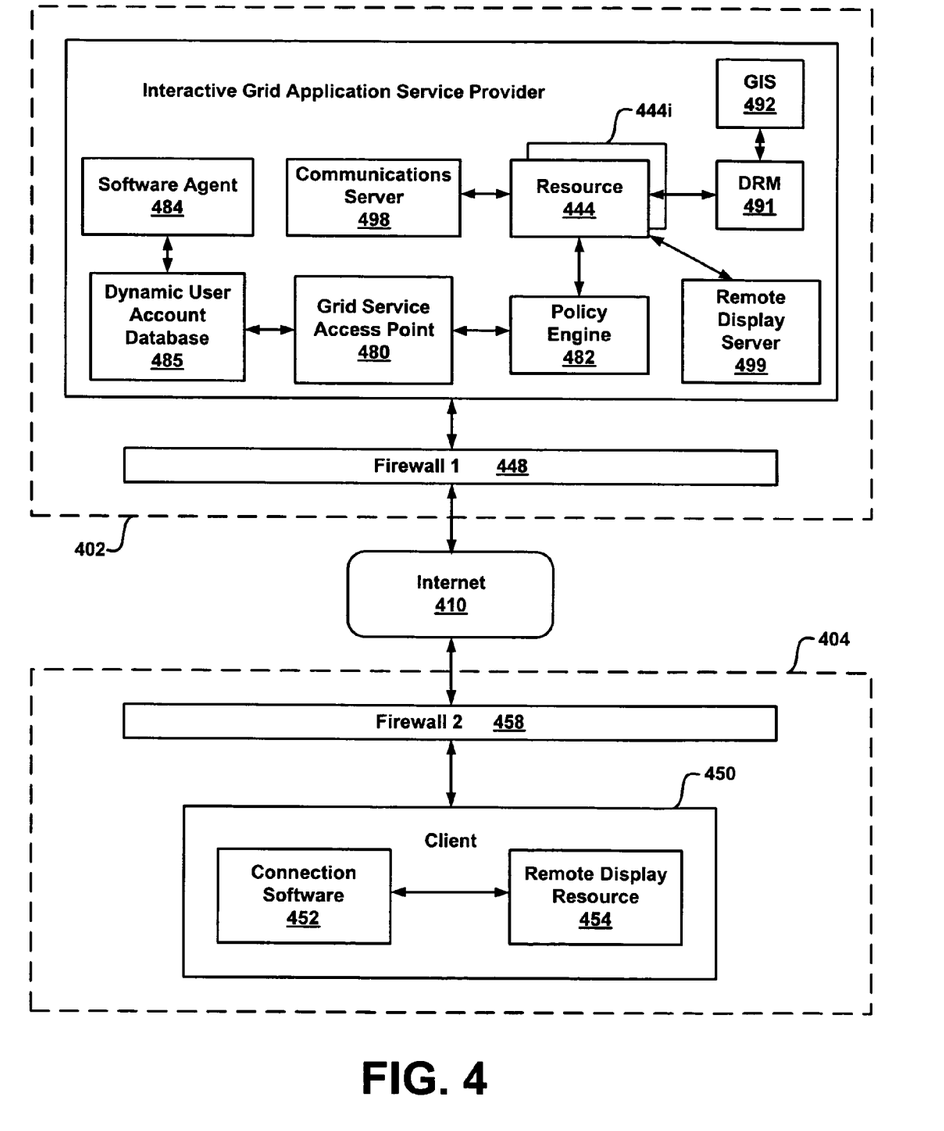
FIG. 4 is a block diagram of an exemplary interactive grid computing system comprising an interactive grid application service provider and a user in accordance with an embodiment of the present invention.

Embodiments of the present invention provide a system architecture comprising an application service provider (ASP) site and a customer site, as illustrated in FIG. 4. The ASP site 402 comprises an interactive grid ASP 440 and a firewall 448. The ASP 440 comprises several resources 444 . . . 444i available for interactive use. Together, the resources comprise a resource pool. Firewall one 448 protects the ASP's resources 444 . . . 444i from denial-of-service and other attacks.

The ASP further comprises a grid service access point 480 for receiving a connection from a client (e.g., client 450). Coupled to the grid service access point is a policy engine 482 that determines user policies based on the classification of a particular user when a connection is first established. Also coupled to the grid service access point 480 is a software agent 484 that is responsible for assigning a dynamic user account based on the user policies from the dynamic user account database (e.g., pool) 485.

The customer side 404 comprises a firewall 458 and a client 450. The client is associated with a particular user. The client 450 comprises connection software 452 and a remote display resource 454. The client 450 first connects to the ASP 440 using connection software 452 that resides on the user's local computer system (e.g., client 450). In one embodiment of the present invention, the connection software may be a web browser application for browsing Internet content. In another embodiment of the invention, the connection software connects to the grid service access point 480 (GSAP) provided externally by ASP 440 as a web service (e.g., a web page). In this embodiment, the connection software (e.g., web browser) connects to the GSAP 480 (e.g., web page) to initiate an interactive grid computing session thereafter client 450 can request a resource (e.g., resource 444).

From the GSAP, the request is forwarded to a grid distributed resource management system (DRM), 491. The DRM 491 matches resource requirements specified by the client 450 to the available resources of the ASP 440. In one embodiment of the invention, the grid Distributed Resource Management (DRM) 491 determines the resources that are available. The customer may request an immediate allocation of resources or may reserve resources for a later time. In an embodiment, at the scheduled time, the DRM 491 instructs software agent 484 associated with the requested resource (e.g., resource 444) to start a remote display server hosted by the ASP. In one embodiment of the invention, the DRM 491 checks with the Grid Information Services (GIS) 492 for resources that meet the requirements of the user. The DRM 491 then identifies the best match based on the information it has collected about the current status of the possible matches.

In one embodiment, the remote display server connects to a communication server hosted by the ASP that handles communication to and from the ASP after the client 450 is connected. At this time, the client 450 also may connect to the communication server using a remote display resource 454. The communication server 498 and the remote display server 499 facilitate communication between a remote display server on the ASP side 402 and the remote display resource 454 on the customer side 404 by going through the firewall one 448 and firewall two 458. The remote display resource 454 displays the graphical desktop of the resource requested on the user's local computer (e.g., client 450). It is appreciated that system 400 supports both interactive and batch jobs.

Figure 5:
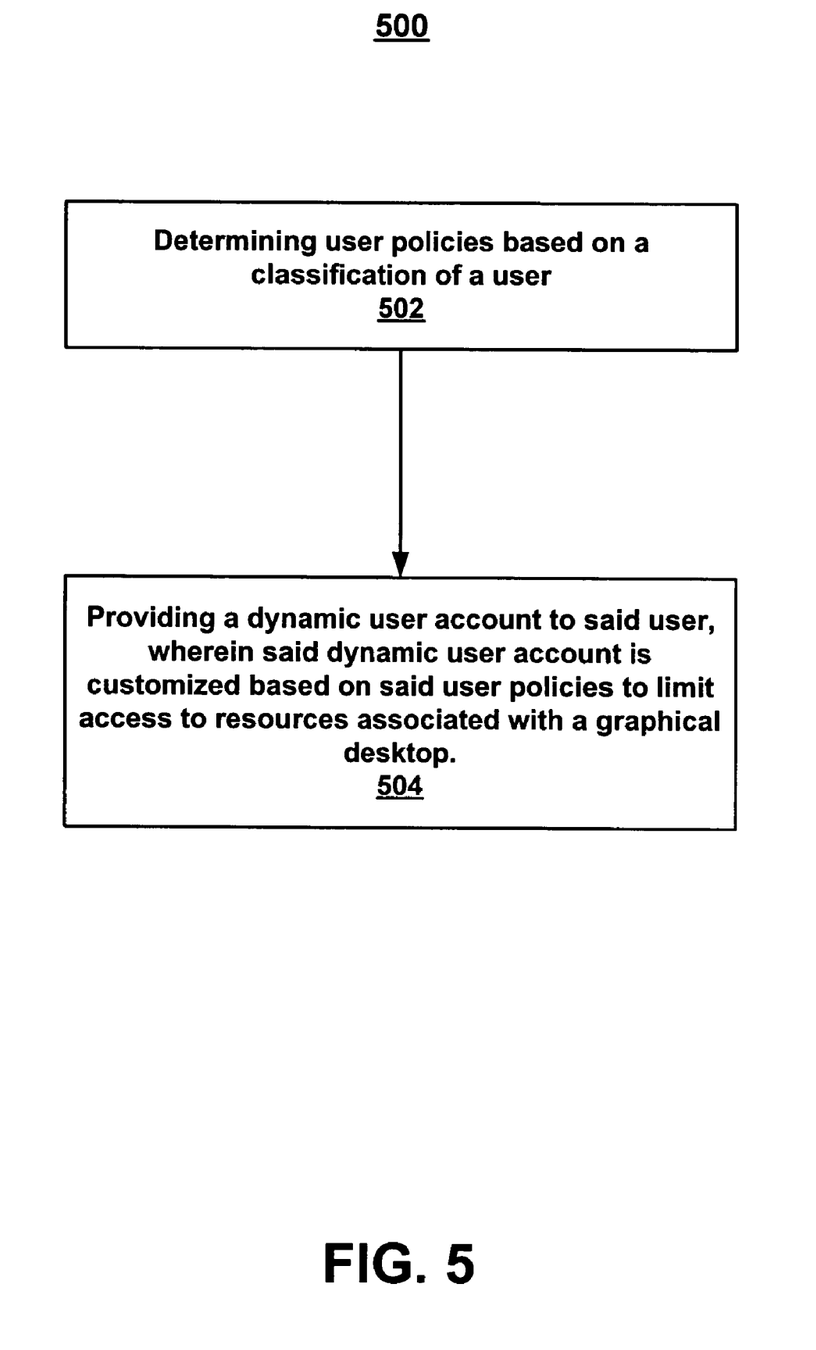
FIG. 5 flow diagram of an exemplary process for providing controlled access to a remote desktop in an interactive grid computing environment in accordance with an embodiment of the present invention.

FIG. 5 is a flow diagram of an exemplary process 500 for controlling access to a remote desktop in an interactive grid computing environment in accordance with an embodiment of the present invention. Process 500 begins with step 502, determining user policies for a user based on the classification of the user. The next step 504 is to provide a dynamic user account to the user based on the user policies determined in step 502. In one embodiment of the present invention, a policy engine determines the user classification and determines the user policies based on the classification. In one embodiment of the invention, the dynamic user account is modified to control access to a shell, a remote desktop, and/or remote file explorer.

Embodiments of the present invention determine user policies based on a user classification to assign a dynamic user account with limited access to particular resources on an interactive grid computing system. In accordance with embodiments of the invention, user policies determine the terms of use for a particular resource such as resource allocation (e.g., CPU usage, memory allocation, functionality). In addition, the user policies limit the use of particular files, executables, and commands accessible from a graphical desktop. In one embodiment, user policies are determined and a dynamic user account is customized according to the limitations defined by the user policies.

In one embodiment of the invention, a dynamic user account (e.g., template account) is used to manage and scale user accessibility to particular resources and/or commands on a controlled desktop. In one embodiment of the invention, a dynamic user account comprises configuration files that determine the configurations for the user. For example, the dynamic user account comprises a configuration file for the desktop, the shell, and the file explorer. In one embodiment of the invention, a dynamic user account is customized to control desktop access by customizing configuration files corresponding to desktop access. Likewise, shell access can be controlled by customizing configuration files corresponding to the shell. Furthermore, file explorer access can be controlled by customizing configuration files specific to the file explorer. In one embodiment of the invention, the configuration files are customized by defining many different attributes, such as client authorized commands, applications, files, icons, menu items or any other resource. For example, referring to FIG. 6A, the user attributes 605 limit use to commands ls, vi, exit, cc, gdb, and make. In addition, the user attributes limit use to the applications StarOffice and RenderMan.

Figure 6A:
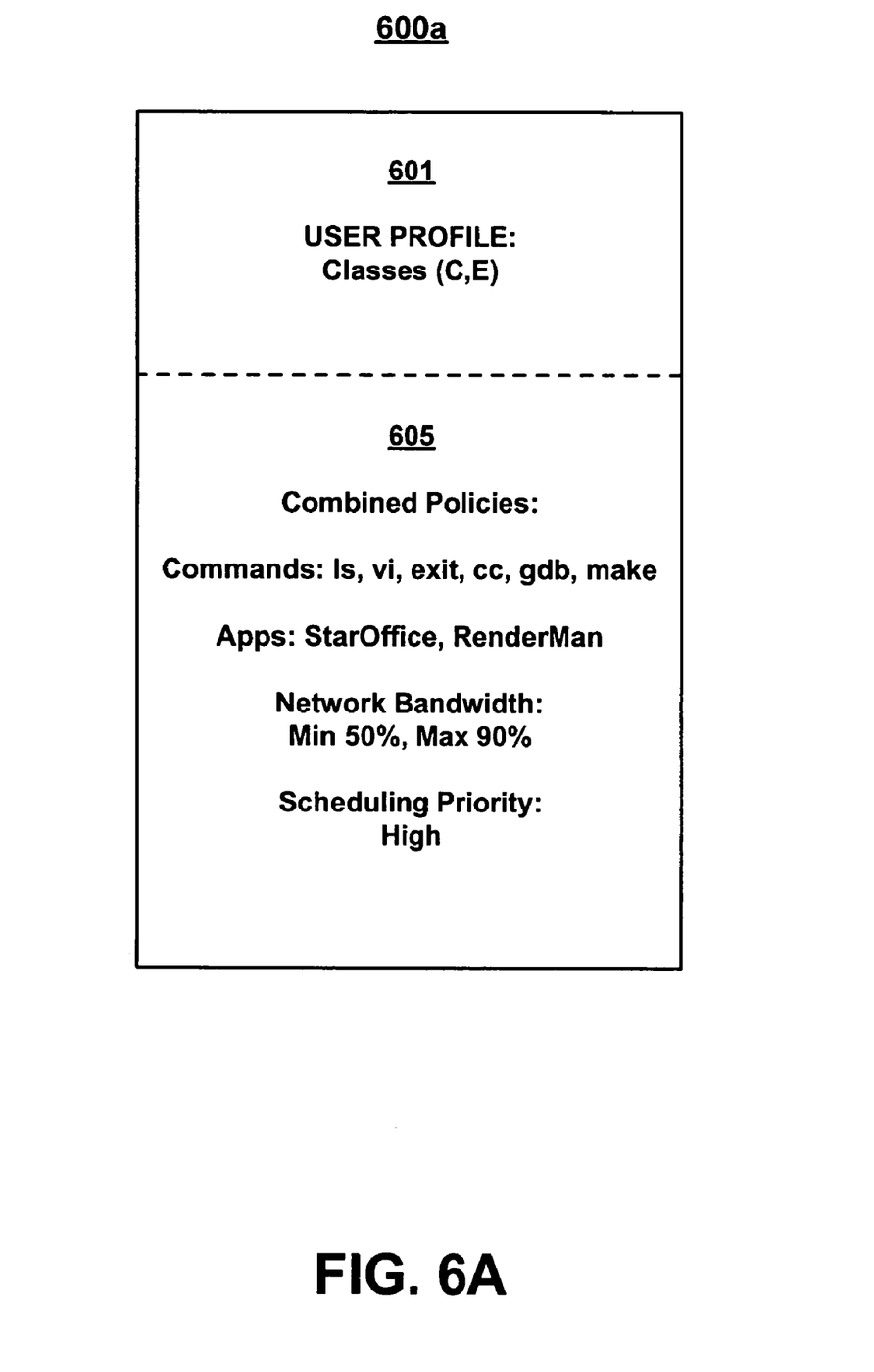
FIG. 6A is a block diagram of an exemplary user profile in accordance with embodiments of the present invention.

FIG. 6a shows a diagram for a dynamic account user profile 601, in accordance with one embodiment of the present invention. In general, the attributes 605 of the classes that a user belongs to are aggregated through inheritance between classes and the combining of classes. When conflicts exist between attributes, conflicts are resolved through the application of conflict resolution rules. Although a class hierarchy that avoids conflicts may be developed by increasing the number of classes, the use of conflict resolution rules generally allows a group of users to be accommodated by a smaller number of classes.

In one embodiment using an iterative process, inherited attribute conflict resolution for each class associated with a user is done, followed by merging of the classes, one at a time, with conflict resolution rules being applied after the merger of each class. In another iterative method embodiment, a first class has its outstanding inheritance conflicts resolved, followed by inherited conflict resolution in a second class, with the subsequent combination and conflict resolution for the combined classes. This process may be repeated for each class being combined in order to determine the policy file for a user.

The class hierarchy and conflict resolution rules simplify the work of a domain administrator, as they will have to manage only a relatively small set of classes. The system administrator might have to add a new class. He may also have to add or modify the attributes of the class. However these activities will not be frequent. The time required will be much less than managing the policy files of each user or group or users on an individual basis.

Instead of dealing with a set of policy files that may be equal to the number of users, an administrator is able to manage a much smaller set of policy files that are associated with the classes in the hierarchy. Management of these classes may also be facilitated by having each class correspond to a role in the real world. Thus, members of the finance department can have one role, while members of the engineering department can have another role.

A set of classes can be used to implement a controlled shell, for example, for users of a resource. For example, consider a class of system administrators. Just as the controlled shell for normal users is governed by a policy file listing allowed commands and applications, the controlled shell for superusers may also similarly governed.

The controlled shell given to system administrators will allow them to execute commands and applications according to their duties. If all system administrators share certain duties such as applying operating system (OS) patches, running file backup service and monitoring and enforcing resource usage limits, then command and applications needed for these functions may be placed in the policy file for all system administrators.

Each system administrator might be responsible for installing and maintaining a certain group of applications. A class of dynamic accounts may be maintained for each of these application groups. The list of commands and applications allowed for these classes and the directories and files they are allowed to modify are specific to their application group.

When a system administrator connects to a grid computing resource and is allocated a dynamic account, the set of policy files governing that account is created by the combination of policies appropriate to this administrator's roles. If the administrator is responsible for applications belonging to two classes, his user profile may be obtained by merging the basic class for system administrators with the classes containing the application privileges for the applications he is responsible for.

All dynamic accounts created for a group of users on a computer may be created from the same set of classes. This set of classes may be arranged in one or more hierarchies. When a dynamic account is allocated to a user, the policy files required for his account are created by merging the privileges in the policy files of all the classes that together describe his functions. Once the user profile containing the customized policy files has been created, the user is connected to the desktop of an interactive session on the allocated computer using the dynamic account. The session is monitored by agents that enforce the newly created user policy file. The controlled shells and controlled desktop of the session allow only commands and applications that the newly created user policy file allows.

In one embodiment of the invention, the method further comprises editing a desktop configuration file based on the dynamic user account to limit access only to user authorized icons on the graphical desktop. Furthermore, the user authorized icons can be displayed on the graphical desktop. In another embodiment of the invention, the method further comprises editing a list of applications accessible through a shell based on the dynamic user account to limit access to user authorized applications executable from the shell on the graphical desktop.

Figure 6B:
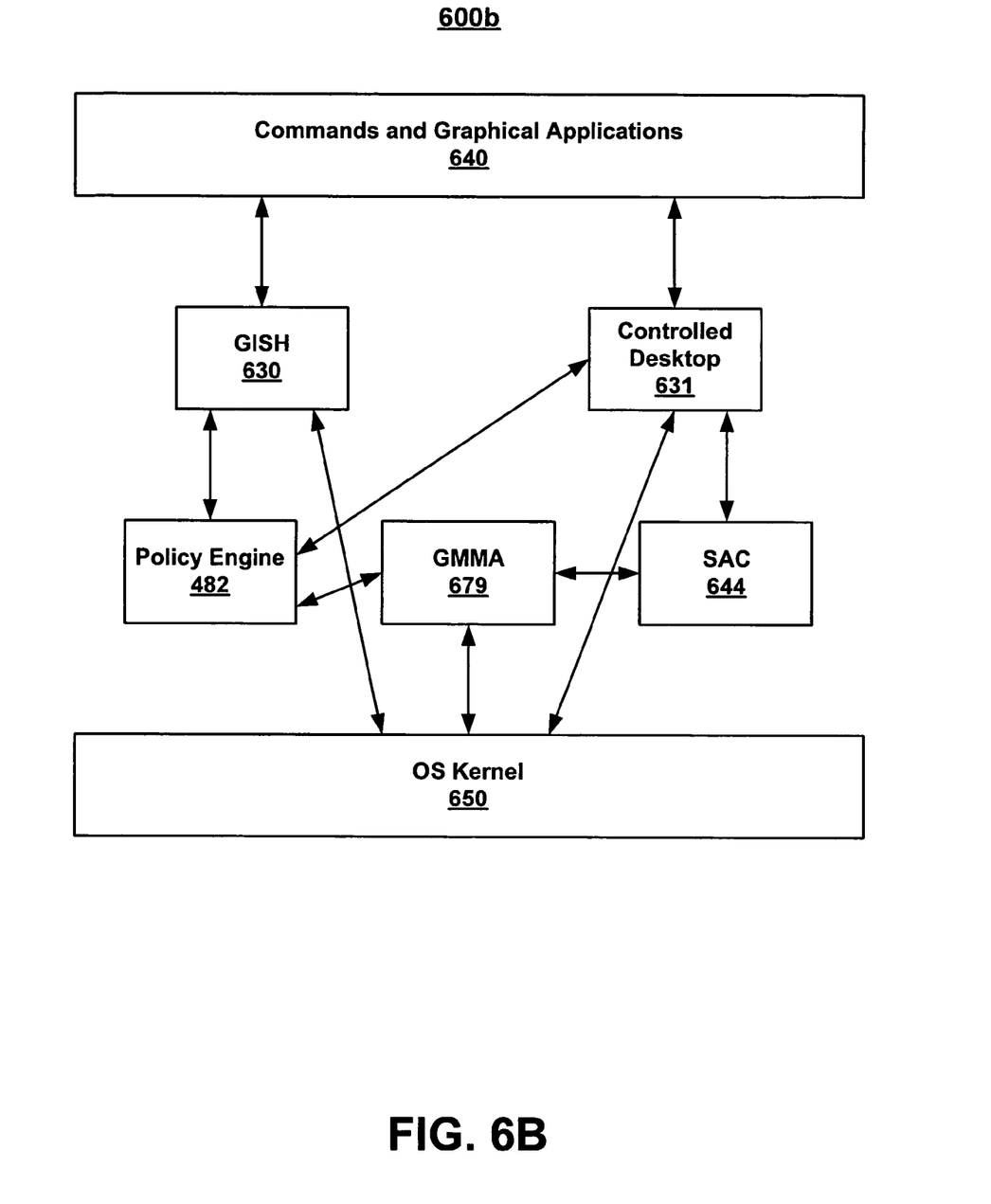
FIG. 6b is a data flow diagram of an exemplary system for providing controlled access to a remote desktop in an interactive grid computing environment in accordance with an embodiment of the present invention.

FIG. 6b is a data flow diagram of an exemplary system 610 for controlling access to a remote desktop in an interactive grid computing system in accordance with an embodiment of the present invention. In one embodiment of the present invention, limitations of a controlled shell and desktop are defined by a dynamic user account and provided to the user during an interactive grid computing session to protect the OS kernel 650. Commands executable from the controlled shell are determined by the dynamic account assigned to the user based on the user's classification in accordance with one embodiment of the invention. In one embodiment, a list of commands executable from a shell is edited to comprise only user authorized commands.

The ASP assigns a dynamic user account based on user policies that control the access to particular features and resources 640 accessible from the remote desktop. In one embodiment of the present invention, a grid interactive shell (GISH) 630 is a controlled shell that provides the first line of defense against malicious users. The GISH 630 allows admission control to be enforces when applications are launched. Commands must belong to an allowed list of commands and runtime arguments before GISH will allow them to be executed. When the command line typed by the user is parsed by GISH 630, a sequence of checks can be performed to ensure that the user is permitted to execute the command.

In addition to specifying an allowed list of commands and their options, the system administrator can customize the directories and files to which the user is allowed access. In one embodiment of the invention, the dynamic user account is used to prevent a user from looking at files which normal users have access to, but might be used for malicious intent by the user. Grid users can also have restrictions on programs compiled by them based on the dynamic user account assigned to them. In that case, the program's source code can be submitted to the ASP for certification as safe. Then the compiled binary can be placed by the system administrator in a unique directory, and added to the allowed list of commands. Alternatively, a virtual machine with controlled access to disk and network can be provided, and the user can launch the compiled binary within the virtual machine, without waiting for certification by the ASP.

In addition to being a shell for a controlled user, in one embodiment of the invention, GISH can also be invoked as a shell for a controlled superuser. A superuser belongs to a different class than a regular user and therefore receives different user policies and a different dynamic user account with more privileges than a regular user. The privileges are allowed only to users allowed to invoke the superuser shell command. This is beneficial when certain trusted grid customers are given permission to assume root privilege for installation and updates for specific applications or daemons. In controlled superuser mode, GISH uses another list of allowed commands.

In addition to a controlled shell, in one embodiment of the invention, a controlled desktop 631 can be specified by the dynamic user account assigned to the user based on the user's classification. The controlled desktop 631 is similar to the controlled shell in terms of the policies enforced. The desktop's menus and icons can be customized by a file that is owned by root, and the user is not given permission to add or modify menu items or icons. This gives the user information on the applications available to him/her. To prevent the user from running an application that is not allowed, either the window manager's code can be modified or an easier solution involving group management can be followed. The later solution involves maintaining a separate group for potentially every application. Execution permission for an application is given only to group members. If dynamic accounts are used, the dynamic account can be added to all of the application groups the user is allowed at the beginning of a session. When dynamic accounts are finally reclaimed by the system, they can be removed from all the groups.

In one embodiment of the invention, the session admission control (SAC) 644 module is called by GISH 630 and the controlled desktop 631 to determine whether an application selected by the user should be allowed to run. In one embodiment of the invention, data on current utilization of CPU, storage and bandwidth from grid monitoring and management agents (GMMA) 699 as well as historical data determines if additional resources are available to the user.

In one embodiment of the invention, the grid monitoring and management agents (GAMA) 699 monitor both session specific and system wide parameters. Agents in the former category monitor CPU and wall-clock time for a session, number of processes, open files and sockets, etc. Agents in later category can detect inbound intrusion attempts from network traffic, as well as attempts by the grid user to compromise the system based on tracing of system calls. This can be the second line of defense against malicious users, with GISH 630 being the first line of defense.

In one embodiment of the invention, policy files are needed for use enforcement and security issues. The policy engine 482 from FIG. 4 is driven by rules and can assign a particular user policy to a user based on the user classification.

In one embodiment of the invention, dynamic accounts or templates are used to assign permissions to users. The dynamic accounts make resource virtualization more appropriate for grids. The scalability and manageability of the system are enhanced if personal user accounts for every user are not used. Any site that participates in the grid will check the user's membership with the directory during authentication. Once the user is authenticated, the user is assigned a dynamic account from a pool of available dynamic user accounts. In one embodiment of the invention, the dynamic account is a Unix account. The dynamic account is freed at the termination time and returned to the account pool.

Figure 7:
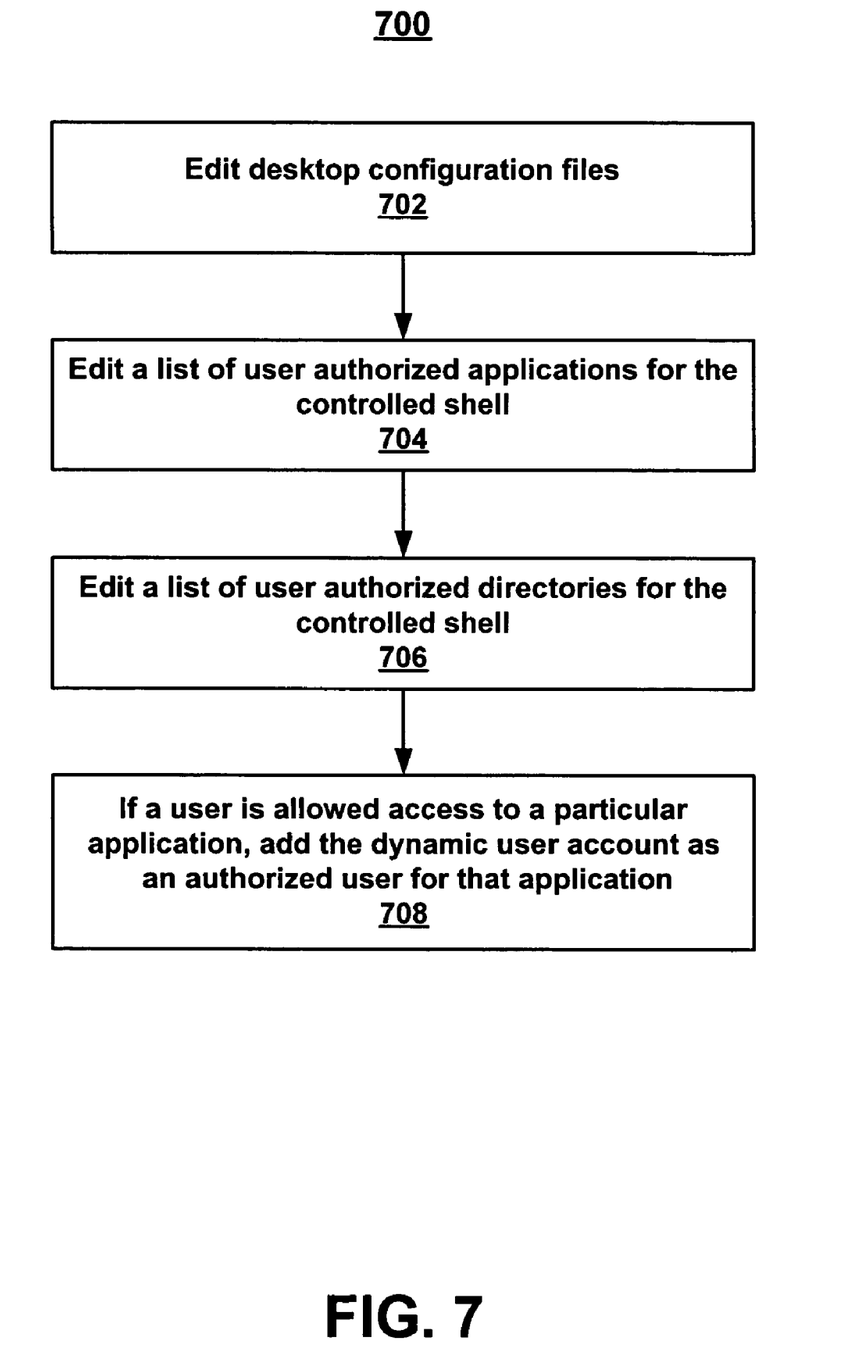
FIG. 7 is a flow diagram of an exemplary process for establishing a controlled desktop in an interactive grid environment in accordance with embodiments of the present invention.

FIG. 7 is a flow diagram of an exemplary computer process 700 for establishing a controlled graphical desktop based on a dynamic user account for controlling access to resources on a graphical desktop in accordance with an embodiment of the invention. It is appreciated that the steps of exemplary computer process 700 can be performed automatically in a computer system. The exemplary controlled file explorer of the present invention is modified such that a user can browse only the folders and files he is authorized to view. The file explorer consults the same authorization policy file that the controlled shell consults to determine which folders and files are user-authorized. The first step 702 is to edit desktop configuration files based on a dynamic user account such that only user authorized applications are displayed on the graphical desktop. In one embodiment of the invention, only user authorized icons are displayed on the graphical desktop. In another embodiment of the invention, only user authorized menu items are displayed on the graphical desktop. The next step, 704, is to edit a list of applications allowed by the controlled shell, based on the dynamic user account of the current user, to limit access to applications executable from the shell. In one embodiment of the invention, only user authorized applications are displayed on the graphical desktop. The next step 706 is to edit a list of directories (e.g., folders) allowed for listing (e.g., browsing) by the current user based on the dynamic user account of that user. In one embodiment of the invention, only user authorized files (e.g., folders) are displayed on the graphical desktop. The next step 708 is, for each application group, if the current user is allowed to execute that application, ensuring that the dynamic account of the current user is added to the group. In one embodiment of the invention, if an application is not on an allowed list, the dynamic account of the user is removed from the application as an authorized user. In an alternative embodiment, the file explorer is used to control execution of particular applications. In one embodiment of the invention, exemplary process 700 is completed before the remote desktop server is started.

Embodiments of the present invention, a system and method for controlling access in an interactive grid environment have been described. While the present invention has been described in particular embodiments, it should be appreciated that the present invention should not be construed as limited by such embodiments, but rather construed according to the following Claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for controlling access in an interactive grid environment comprising:
   receiving a request from a user, wherein said request comprises at least one requested application;
   determining user policies based on a classification of said user, wherein said user polices limit resources available to said user;
   determine a remote executable node, wherein said remote executable node is configured to execute a session for said user;
   providing a dynamic user account, wherein said dynamic user account is automatically customized based on said user policies;
   reserving said executable node and said at least one requested application; and
   establishing a session between said user and said remote execution node, wherein said session is configured to limit resources permitted by said user policies.

2. The method as described in claim 1 further comprising editing a desktop configuration file based on said dynamic user account to limit access only to user authorized icons on said remote executable node.

3. The method as described in claim 2 further comprising displaying said user authorized icons on said remote executable node.

4. The method as described in claim 1 further comprising editing a desktop configuration file based on said dynamic user account to limit access only to user authorized menu items on said remote executable node.

5. The method as described in claim 4 further comprising displaying said user authorized menu items on said remote executable node.

6. The method as described in claim 1 further comprising editing a list of applications accessible through a shell based on said dynamic user account to limit access to user authorized applications executable from said shell on said remote executable node.

7. The method as described in claim 1 further comprising editing a list of directories allowed for browsing based on said dynamic user account to limit access to user authorized files of a explorer on said remote executable node.

8. The method as described in claim 1 further comprising editing a list of commands executable from a shell based on said dynamic user account to limit access to user authorized commands executable from said shell on said remote executable node.

9. The method as described in claim 1 further comprising editing permissions of an application accessible from said remote executable node based on said dynamic user account.

10. The method as described in claim 1 further comprising authenticating said user before determining said user classification.

11. A computer readable medium comprising executable instructions which, when executed in a processing system, causes the system to perform the steps for a method of controlling access in an interactive grid environment comprising:
   receiving a request from a user, wherein said request comprises at least one requested application;
   determining user policies based on a classification of said user, wherein said user polices limit resources available to said user;
   determine a remote executable node, wherein said remote executable node is configured to execute a session for said user;

providing a dynamic user account, wherein said dynamic user account is automatically customized based on said user policies; and reserving said executable node and said at least one requested application; and establishing a session between said user and said remote execution node, wherein said session is configured to limit resources permitted by said user policies.

12. The computer readable medium as described in claim 11 wherein said method further comprises editing desktop configuration files based on said dynamic user account to limit access only to user authorized icons on said remote executable node.

13. The computer readable medium as described in claim 12 wherein said method further comprises displaying said user authorized icons on said remote executable node.

14. The computer readable medium as described in claim 11 wherein said method further comprises editing desktop configuration files based on said dynamic user account to limit access only to user authorized menu items on said remote executable node.

15. The computer readable medium as described in claim 14 wherein said method further comprises displaying said user authorized menu items on said remote executable node.

16. The computer readable medium as described in claim 11 wherein said method further comprises editing a list of applications accessible through a shell based on said dynamic user account to limit access to applications executable from said shell on said remote executable node.

17. The computer readable medium as described in claim 11 wherein said method further comprises editing a list of directories allowed for browsing based on said dynamic user account to limit access to user authorized files of a explorer on a remote executable node.

18. The computer readable medium as described in claim 11 wherein said method further comprises editing a list of commands executable from a shell based on said dynamic user account to limit access to user authorized commands executable from said shell on said remote executable node.

19. The computer readable medium as described in claim 11 wherein said method further comprises editing permissions of an application accessible from said remote executable node based on said dynamic user account.

20. The computer readable medium as described in claim 11 wherein said method further comprises authenticating said user before determining said user classification.

21. An interactive grid computing system for controlling access in an interactive grid environment comprising:

a resource;

a grid service access point coupled to said resource for receiving a request from a client for said resource;

a policy engine coupled to said grid service access point for determining user policies based on a classification of said client, wherein said user polices limit resources permitted by said user policies;

a software agent coupled to said policy engine for assigning a dynamic user account for said resource to said client, wherein said dynamic user account is automatically customized based on said user policies, and for reserving said executable node, said resource, and at least one requested application.

22. The interactive grid computing system as described in claim 21 wherein said dynamic user account limits access to said resource by limiting access only to client authorized icons on a remote executable node of said resource.

23. The interactive grid computing system as described in claim 22 wherein said client authorized icons are displayed on said remote executable node of said resource.

24. The interactive grid computing system as described in claim 21 wherein said dynamic user account limits access to said resource by limiting access only to client authorized menu items on a remote executable node of said resource.

25. The interactive grid computing system as described in claim 24 wherein said client authorized menu items are displayed on a remote executable node of said resource.

26. The interactive grid computing system as described in claim 21 wherein said dynamic user account limits access to said resource by limiting access to commands executable from a shell on a remote executable node of said resource.

27. The interactive grid computing system as described in claim 21 wherein said dynamic user account limits access to said resource by limiting access only to client authorized files of a file explorer on a remote executable node of said resource.

28. The interactive grid computing system as described in claim 27 wherein said client authorized files of a file explorer are displayed on a remote executable node of said resource.

29. The interactive grid computing system as described in claim 21 wherein said grid service access point authenticates said user.

* * * * *

UNITED STATES PATENT AND TRADEMARK OFFICE
CERTIFICATE OF CORRECTION

PATENT NO.        : 7,475,419 B1                                          Page 1 of 1
APPLICATION NO. : 10/665879
DATED             : January 6, 2009
INVENTOR(S)       : Sujoy Basu et al.

It is certified that error appears in the above-identified patent and that said Letters Patent is hereby corrected as shown below:

In column 12, line 7, in Claim 1, delete "polices" and insert -- policies --, therefor.

In column 12, line 63, in Claim 11, delete "polices" and insert -- policies --, therefor.

In column 14, line 8, in Claim 21, delete "polices" and insert -- policies --, therefor.

Signed and Sealed this

First Day of September, 2009

David J. Kappos
*Director of the United States Patent and Trademark Office*